May 5, 1953 A. M. B. CHARLIN 2,637,785

MAGNETIC SOUND-RECORDING APPARATUS

Filed Oct. 16, 1948

André Marie Bernard Charlin
INVENTOR

By Richardson and David
his ATTYS.

Patented May 5, 1953 2,637,785

UNITED STATES PATENT OFFICE 2,637,785

MAGNETIC SOUND-RECORDING APPARATUS

André Marie Bernard Charlin, Montrouge, France, assignor to Products and Licensing Corporation, New York, N. Y., a corporation of Delaware Application October 16, 1948, Serial No. 54,953
In France November 12, 1947

15 Claims. (Cl. 179—100.2)

This invention relates to an apparatus for recording sound and for reproducing it subsequently on a film coated with magnetic oxide. It is known that such machines are essentially comprised of a take-up reel adapted to drive the film and pass it through the magnetic gap provided in a magnetic circuit the winding of which is energized with the telephone current to be registered. The iron oxide film engaging the gap is more or less deeply magnetized according to the field created by the telephone currents in the gap. The picking-up of the record thus made is carried out on the same apparatus, but the operation is reversed in that it is the magnetized iron oxide particles which will now induce, when passing through the magnetic circuit gap, a telephone current in the winding, the latter being connected to the input of an electronic amplifier. Such apparatus has heretofore been designed in view of reproducing simply sound-records for broadcasting and gramophone-reproduction purposes.

This invention constitutes an improvement over the known apparatus of the type described and its main object is to provide a machine of a similar type but adapted to record sound when shooting cinematographic films, which requires a strictly synchronous unwinding connection between both the sound film and the image film.

For this purpose, a method might be used which consists in perforating the magnetic film tape, but the choice of such perforations and their position may effect more or less the regularity of motion of the film pull, the efficiency of use of the film and its strength.

According to my invention, two adequate solutions are available:

(1) A row of axial, small-width, closely spaced perforations (with an axis-to-axis interval of, say, .120 to .160 in.) will increase the film strength while suppressing the usual edges laterally of the twin perforation rows hitherto employed. In this case, two tracks will be available for recording purposes, on either side of the central perforation line, which may be used separately, for example head-to-foot or printed at the same time, one track carrying the sound-record, the other track acting as a pilot track which will be referred to presently. Preferably, the iron oxide coating should not extend over the perforation row in order to avoid any interference by stray modulations due to the magnetic field path passing through the perforation intervals.

Figure 1:
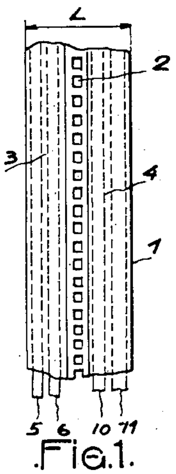

Various embodiments of my invention are shown by way of example in the appended drawing, in which:

Fig. 1 illustrates a film portion 1 having a width L preferably of 20 mm. and a series of axial perforations 2 with .15 in. spacings, a longitudinal dimension of .05 in., a transversal dimension of .07235 in., and round-off edges. Two magnetic tracks 3, 4 are provided on this film, on either side of the perforations, without covering the latter in order to prevent any stray modulations, with a perforation frequency. A plurality of phono-magnetic sound-records may be registered on these tracks, for instance several records 5, 6, 10, 11 having a width of about ⅛ in. each.

Figure 2:
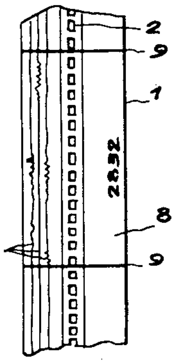

Fig. 2 shows the back side of the film of Fig. 1. On this back face a thin coat of wax, which may be applied through a spraying operation on the entire film surface in a mist form and which may receive the image signals from a sound recorder mark the starting and end points of the modulations recorded magnetically on the other face of the film. Such records are shown in parallel relationship at 7 in Fig. 2. The provision of record lines of this type will greatly facilitate the work of film-cutters. Since they are not readily blanked out, if the film record must be picked up from the magnetic coating the etching point will be moved sidewise by from $\frac{1}{32}$ in. to $\frac{3}{32}$ in. on each new magnetic printing so that the records may be differentiated from one another. Thus, the first record may be the closest to the film edge. On this face, cross lines 9 are provided from edge to edge. Their spacing corresponds to the actual length of a projected or shot film image. As each image is exactly at right angles with the film edge, the film-cutter may cut the sound film with the utmost accuracy for assembling purposes. These lines 9 may be either printed on the base or more simply engraved in the wax layer applied on the back face of the sound-film when such a layer is used. It will be also noted that in this figure a number (designated at 8) is periodically repeated along the film, the spacing between two of these numbers corresponding to the unit-measure employed in the cinematographic picture film. Thus, if for example the cinematographic picture film is graduated in British length measures in its margin while the magnetic sound film is moved at a speed three times higher, the spacing of these numbers on the magnetic film will be three feet in order to enable the cutter to always find an accurate proportion between the sound footage and the picture footage.

Figure 3:
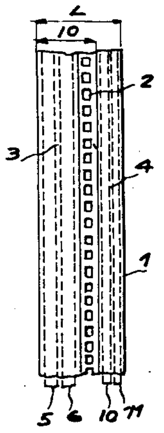

Fig. 3 illustrates a film pattern identical to Figs. 1 and 2 except that the perforation row is slightly off center while the total width of the film is reduced. The dimensions of this type of film may be as follows: width L=16 mm., spacing and bridging portions between perforations may be similar to those of Fig. 1 with the axis of the perforations at say .387 in. from the guiding edge. A recording means will be thus available on the left of the perforations, as before, for a plurality of sound tracks, for example two tracks 5, 6 of 3 mm. each while on the right side space will be also available for recording one or several narrower tracks either for other sound or more specifically for pilot tracks in view of adjusting the dynamic of tracks registered on the left side (for instance tracks registered one at 500 cycles and another at 1,800 cycles and either amplitude- or frequency modulated in accordance with the envelope curve of two modulations registered on the tracks on the left-side of the perforations).

Figure 4:
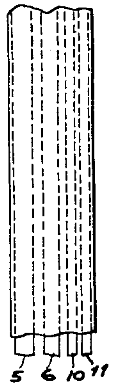
Figure 5:
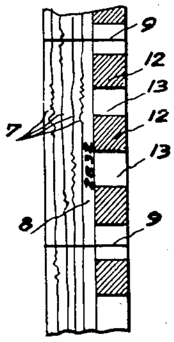

(2) The second system illustrated in Fig. 4 consists in using a tape 1 without any perforations but having its back face (Fig. 5) i. e. opposite to the magnetic coat, printed with a castellated pattern 12, 13 of alternate black and white battlements. When moving the band shown in Fig. 5 in the apparatus of Fig. 6 in front of an optical pick-up system 15 provided with a photo-electric cell 17, electrical impulses would be applied to the photo-electric cell which, after adequate amplification through an amplifier 18, would be used for controlling or actuating the electro-motor 20 of the camera or projector apparatus 21. Thus, it will be seen in Fig. 6 that the arrangement may comprise a sound film 1 shown on the opposite face of its magnetic sound-sensitive coating, said opposite face being castellated as shown in Fig. 5. An optical pick-up device comprising a lamp 15 and a condensing lens 16 illuminates the film surface through an aperture or gate 22 interposed between the film and the condensing lens. A photo-electric cell 17 collects the light-beam reflected through the gate. An amplifier 18 of standard design feeds the amplified current to a field winding 19 controlling an electro-motor 20 operatively connected with the film-pulling mechanism of the camera or projector 21. It will be readily understood, in these conditions, that the steady tape pull ensured by the take-up roller 34 will also provide, at the same time, a steady motion of the camera or projector 21.

Figure 6:
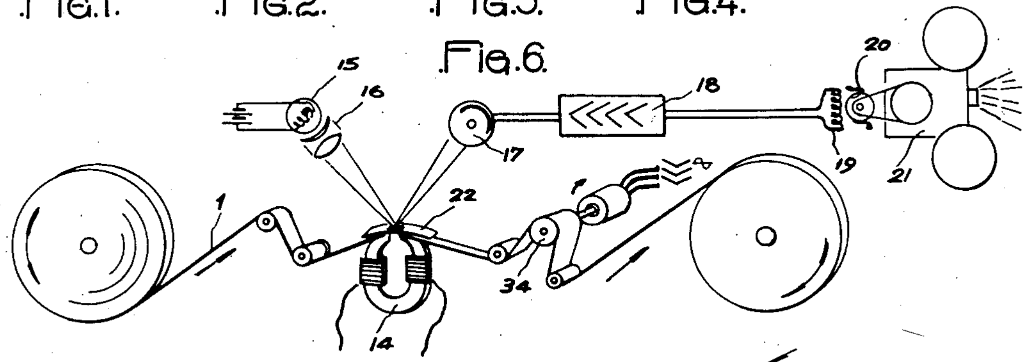
Figures 7, 8:
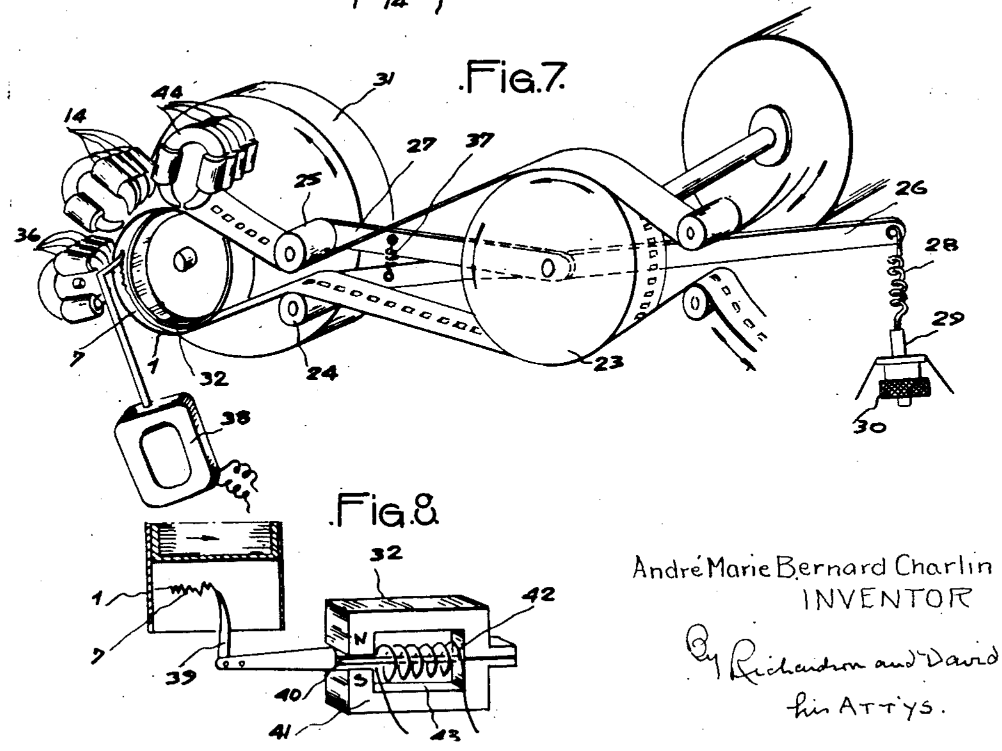

Fig. 7 shows a magnet-film driving mechanism intended more particularly for use with films of the pattern shown in Figs. 1 and 3. The film driving mechanism employed in this machine is already known and forms the subject-matter of a letters patent by the applicant (French Patent No. 887,376 of October 31, 1942) relating more specifically to the picking-up and recording of sound from and on a photographic film. The device described in this patent is comprised essentially of a film driving drum 23 carrying peripheral teeth disposed axially with the film pitch; the drum 23 is driven in turn by a motor 33 operated in synchronism with the motor of the camera or projector 21 (Fig. 6). This driving drum 23 acts both as a feeding and pulling member on the film 1. The latter, after being fed by the drum 23 is passed around a cylinder 32 coaxial and rigidly connected with a flywheel 31. All the pick-up and registering operations will be made on this cylinder by means of a magnetizer 14 or a pick-up device 36. A pair of guiding rollers 24, 25 is provided, each roller rotating freely on two pivotally mounted levers 26, 27, respectively, whereby the film is held tightly over the periphery of the pick-up or registering cylinder 32 due to the resilient action of a spring member 37 tending to bring the two rollers 24, 25 closer to each other. Furthermore, both rollers may swing freely, e. g. concentrically to the axis of the driving drum 23 and a spring means 28, whereby they will tend to take the central, balanced position shown in the drawing, as soon as the freewheel 31, has reached its normal rotational speed. To this end a screw member 29 and a hand-nut 30 are provided for adjusting the force of the spring member 28. Under these conditions it will be readily understood that every slight pull likely to occur due to the meshing of the sprocket teeth with the perforations will be damped out and absorbed by the device described above, as well as any speed variations imputable to controlled motors (a most usual feature commonly called "pumping effect") due to the flywheel inertia which is much more considerable than the inertia of the small-sized, swinging rollers. Thus, the pick-up drum may carry the total width of the film or only as much as one half thereof, which is largely sufficient, in practice, for allowing the etching point 38 to penetrate freely into the cylinder 32 for engraving the synchronizing sound-record.

Fig. 8 illustrates an embodiment of the engraving device according to the invention.

In this figure, reference number 32 designates the already-described compensator drum around which the film 1 is driven with one portion thereof overhanging from the front side of the cylinder. A resiliently-supported etching point 39, having a curved end portion, is introduced into the outwardly protruding portion of the film and is slightly pressed on the waxy face thereof, thus forming a line 7 on account of the motion imparted to the film. The registering point is supported by a vibrating armature 40 disposed in the gap formed between the polar pieces of a magnetic path 41, the armature being secured to the bottom side 42 of said magnetic path. A coil 43 surrounds the flexible armature 40. The magnetic path 41 has a permanent magnetic field flowing from its north to its south poles (N and S in the figure). It will be understood that if the alternate tension of a telephone current registered elsewhere by means of the magnetizer 14 is applied to the device, alternate north and south polarities will act on the armature 40 thus causing same to vibrate due to the alternate pulls and repulsions to which it is subjected on account of its polarity. Any other suitable means could be used, e. g. a piezo-electric registering apparatus utilizing Seignette salt or an electro-dynamic device of the type employed in the manufacture of loud-speakers. On the other hand, instead of energizing the sound-recorder winding directly with the telephone current received, the latter could be applied to the winding after detection by merely employing the curve envelope if the operator thinks the novel feature of this sound-record is more practical for film-cutting operations.

Regarding more specifically the magnetic sound recording process, it will be preferable, if a high-grade recording dynamic is desired, to print the magnetic modulation on the sound-film, on the one hand, either by means of a single magnetic path with the usual gap, or with the assistance of a pair of side-by-side paths for recording each in phase-shifted relationship a sound-track (push-pull registering) in order to reduce the harmonic distortion, yet it would be advantageous to compress the record modulation amplitude and register on a third track a modulation for controlling automatically, on picking-up the sound record, an expansion device which will restore its normal dynamic value on registering. This record may be formed by a fixed frequency, for instance 1,000 C. P. S. which will be modulated according to the envelope curve of the modulation either in amplitude, or still better in frequency. The transmitting and detecting amplifier means to be used in association with such a system are too well known to require any detailed description thereof herein and the inventor will only claim the novel application of these known processes to magnetic sound-films or records and more particularly to synchronized magnetic sound-records as used in the cinematographic art.

From the foregoing, it will be noted that in connection with the apparatus shown in Fig. 7 the two first magnetizers may be used for recording sound according to the push-pull system.

In this case, the third portion of the magnetizer will print, by means of a frequency- or amplitude modulated frequency, the expansion pilot track. The fourth element may be employed subsequently either for recording a significant noise background in view of the final mixing operation, or music or songs recorded in advance and used as a guiding frame for the players' acting on the set or for the orchestra conductor when recording the last and definitive sound-film. The four tracks may be also used as follows: the first two pick-up devices will each record the sound issuing from a microphone positioned to pick up the sounds according to the stereophonic method, while the other two tracks act as pilot tracks for controlling the dynamic value of each of the records made on the former pair of tracks. The latter may be also used for push-pull sound recording while the other magnetizers will be employed for printing the pilot curve of the dynamic value according to the stereophonic recording method described in another patent to the applicant (French Patent No. 902,717 of March 15, 1944).

It will be apparent from an inspection of Fig. 7 that the pick-up devices 36 are also fourfold for permitting, on the one hand, a rapid checking of the various tracks during the recording thereof; in fact, the monitor man does not check the sound directly through the head-phones or a loudspeaker connected to the microphone amplifier, but through the intermediary of these pick-up devices which repeat the sound one fraction of a second after it has been recorded. When the sound will be utilized, the four pick-up devices will act similarly, each according to its own function. A third set of four magnetizers 44 is also provided either for blanking purposes or for modifying the magnetic surface before it is recorded by means of the magnetizer 14. It is understood that all the devices described may be also used in conjunction with arrangements in which the picture would be juxtaposed on the same film which carries the sound magnetic record. However, it will be more adequate to employ the sound magnetic film only for recording sound "takes" in conjunction with, or at the moment of picture "takes," so that the sounds registered may be subsequently re-recorded in the form of photographic sound records in view of establishing the definitive cinematographic film.

The sound-record provided on the back face of the film for marking the modulations printed on the other face may be obtained separately from the registering apparatus. In this case, the film may be unwound either at normal or at reduced speed. The sound, which is to be reproduced by a sound-engraving process is picked up by the usual magnetic pick-up device, then amplified through an ordinary electronic amplifier the output of which is fed to the sound-recorder, the latter being arranged to transfer the marking record just beneath the magnetic pick-up device provided for this purpose.

Having thus described my invention, what I claim is:

1. Film for magnetic sound-recording comprising a tape, a row of small-width, axially disposed perforations in said tape and two tracks covered with a sound-recording magnetic layer on either side of said row of perforations on one face of the tape, a layer of insulating material on the other face of said tape, and a plurality of indicia axially disposed along said tape and engraved into said layer.

2. Film for magnetic sound-recording comprising a tape, a row of small-width, axially disposed perforations in said tape, two tracks covered with a sound-recording magnetic layer on either side of said row of perforations on one face of the tape, a layer of engravable material on the other face, and transversally arranged lines engraved in said material and spaced from one another by intervals corresponding to that of cinematographic images on said other face of said tape.

3. Film for magnetic sound-recording comprising a tape, a row of small-width, axially disposed perforations in said tape, two tracks covered with a sound-recording magnetic layer on either side of said row of perforations on one face of the tape having thereon an engraved sound track, a layer of engravable material on the other face, and a plurality of indicia carried by said tape and spaced from one another by intervals corresponding to the footage of the cinematographic film accompanying said sound recording film.

4. Apparatus for the recording of sound vibrations on a magnetic tape which is to be synchronized with a separate cinematographic record comprising a tape, a row of small width longitudinally disposed perforations in said tape, a plurality of separate and distinct tracks of magnetic material on either side of said row of perforations on one face of said tape, a layer of engravable material on the other face of said tape, a plurality of transversally arranged lines engraved in said material on said other face spaced from one another by intervals corresponding to that of cinematographic images on said separate record, engraving means responsive to sound vibrations contiguous with said tracks of magnetic material, and driving means engaging said perforations.

5. Apparatus as claimed in claim 4 wherein perforations are axially disposed.

6. Apparatus as claimed in claim 4 in which said perforations are disposed to one side of the axis of said tape, one of said tracks of magnetic material being of lesser width than another of said tracks.

7. Apparatus as claimed in claim 4 in which said engraving means includes an electro-magnetic sound recorder.

8. Apparatus as claimed in claim 4 in which said engraving means includes a piezo-electric sound recorder.

9. Apparatus as claimed in claim 4 in which said engraving means includes an electro-dynamic sound recorder.

10. Apparatus as claimed in claim 4 having in addition a plurality of indicia disposed along the length of said tape, said indicia being spaced from one another by intervals corresponding to the footage of said separate cinematographic record.

11. Apparatus for the recording of sound vibrations on a magnetic tape which is to be synchronized with a separate cinematographic record comprising a tape, a plurality of distinct tracks of magnetizable material longitudinally disposed on said tape on one side thereof, a layer of engravable material on the other side of said tape, a plurality of transversally arranged lines engraved in said material and spaced from one another by intervals corresponding to that of cinematographic images on said separate record, engraving means responsive to sound vibrations contiguous with said magnetic tracks, and driving means engaging said tape and moving said tape past said engraving means at a predetermined rate.

12. Film for magnetic sound recording comprising a tape, a plurality of distinct tracks of magnetizable material longitudinally disposed on one side of said tape, an engraved sound track of a predetermined pilot signal on one of said tracks, a layer of engravable material on the other face of said tape, and a plurality of transversally arranged lines engraved in said material and spaced from one another by intervals corresponding to that of cinematographic images on a separate cinematographic record.

13. The film of claim 1 in which said row of perforations is off-centrally disposed along said tape.

14. Film for magnetic sound recording comprising a tape, a plurality of magnetizable tracks on one face of said tape carrying audio intelligence thereon, and a control track on the other face of said tape, said control track carrying further intelligence synchronizing said sound tape with a separate cinematographic record, said further intelligence being dependent upon a predetermined ratio of sound track footage to cinematographic record footage.

15. The film of claim 14 in which said further intelligence includes a plurality of transverse lines spaced along said tape, said spacing being dependent upon the spacing of cinematographic images on said separate cinematographic record.

ANDRÉ MARIE BERNARD CHARLIN.

References Cited in the file of this patent

UNITED STATES PATENTS

| Number | Name | Date |
|---|---|---|
| 1,653,467 | O'Neill | Dec. 20, 1927 |
| 1,808,046 | Kuchenmeister | June 2, 1931 |
| 1,836,124 | Kuchenmeister | Dec. 15, 1931 |
| 1,846,110 | Hornauer | Feb. 23, 1932 |
| 1,974,709 | Freund | Sept. 25, 1934 |
| 2,044,333 | Schmidt | June 16, 1936 |
| 2,052,792 | Owens | Sept. 1, 1936 |
| 2,503,083 | Waller | Apr. 4, 1950 |